United States Patent [19]

Holley et al.

[11] Patent Number: 4,854,112
[45] Date of Patent: Aug. 8, 1989

[54] TURF MAINTENANCE APPARATUS

[75] Inventors: Charles C. Holley, Bloomington; Walter J. Petersen, Eden Prairie; Michael N. Zenner, Lakeville, all of Minn.

[73] Assignee: The Toro Company, Minneapolis, Minn.

[21] Appl. No.: 93,349

[22] Filed: Sep. 4, 1987

[51] Int. Cl.[4] .............................................. A01D 34/66
[52] U.S. Cl. .......................................... 56/6; 56/10.4; 56/228; 172/3.11; 172/269
[58] Field of Search ...................... 56/13.6, 6, 7, 328, 56/10.4, 10.2, 249; 172/311, 269, 40, 403; 474/135

[56] References Cited

U.S. PATENT DOCUMENTS

| | | | |
|---|---|---|---|
| 2,299,859 | 10/1942 | Speiser | 56/7 |
| 2,314,215 | 3/1943 | Hilblom | 56/10.4 |
| 3,106,811 | 10/1963 | Heth et al. | 56/7 |
| 3,627,057 | 12/1971 | Hartwig | 172/126 |
| 3,935,712 | 2/1976 | Erickson et al. | 172/40 |
| 4,325,211 | 4/1982 | Witt et al. | 56/15.8 |
| 4,497,160 | 2/1985 | Mullet et al. | 56/6 |
| 4,688,377 | 8/1987 | Winkel et al. | 56/228 |
| 4,715,172 | 12/1987 | Mosby | 56/228 |

OTHER PUBLICATIONS

Brochure No. 88-50-T, 1988, (Toro).

Primary Examiner—John Weiss
Attorney, Agent, or Firm—R. Lawrence Buckley

[57] ABSTRACT

A rotary mower (10) including a front deck assembly (18) and a pair of wing decks (20). Each wing deck (20) is supported by a lift arm assembly including a main lift arm (26) and a lift arm extension (32). A pivot joint (30) exists between lift arms (26) and (32) so that when deck (20) is raised from its cutting position to its transport position it is also caused to rotate so that mower (10) maintains a relatively low profile even when decks (20) are in their transport position. Mower (10) also preferably includes a pair of breakaway assemblies (48) which allow wing decks (20) to "break away" in the event they strike an immovable object. Finally, a preferred mower (10) includes resilient bushing assemblies (38) between (24) to minimize vibration and noise and provides some floating of the decks (20).

14 Claims, 7 Drawing Sheets

TURF MAINTENANCE APPARATUS

TECHNICAL FIELD

The invention relates generally to turf maintenance equipment, and more particularly to methods and apparatus for supporting cutting units of power turf mowers.

BACKGROUND OF THE INVENTION

Although the present invention can be applied to a wide variety of turf maintenance equipment, one particularly advantageous application is power turf mowers. Many types of power turf mowers are known. Such equipment can generally be classified according to the type of cutting unit(s). Typically, the cutting units of a turf mowing machine are either of the rotary, reel or flail type. Reel units are normally used for high precision cutting situations whereas flail units are normally used in severe situations such as roadside mowing. Rotary units, on the other hand, are useful over a wide variety of conditions. Therefore, although the present invention could be used in conjunction with turf maintenance machines and harvesters of any type, for the sake of brevity the invention will be described in terms of a turf mowing machine having one or more rotary cutting units or decks.

Power turf mowing equipment can also be categorized based on the method of propelling the cutting unit. Generally, there are walk-behind; riding; and towed cutting unit mowers. The present invention relates to the latter two types, and particularly to riding mowers; walk-behind mowers are usually found in residential settings, and the present invention does not pertain to such mowers. Thus, for the sake of brevity the invention will be described in terms of riding rotary mowers.

Larger rotary riding mowers typically include a traction vehicle supported by a plurality of wheels; a prime mover connected through a transmission to one or more of the wheels; one or more rotary decks having mechanically or hydraulically driven blades; and one or more lift arms (or analogous structures) pivotally connected to the traction vehicle suitable for supporting the deck(s). Lift arms are so termed because they lift the decks from their normal operating positions to their transport positions, as further discussed below. The present invention involves methods and apparatus for supporting cutting units, and more particularly, lift arms and related structures and systems. More particularly, the present invention is directed toward methods and apparatus for supporting cutting units in their lowered operative positions and in their raised "transport" positions, and for raising and lowering cutting unit between the two extremes.

The preferred characteristics or features of a cutting unit support system vary depending on whether the cutting unit is in its cutting position or in its transport position. In the cutting position, the cutting units are preferably "floated" relative to the traction vehicle. That is, the cutting units are preferably independently and separately supported by the traction vehicle so they can follow the contours or undulations of the ground irrespective of the gross motion of the traction vehicle. If cutting units are not supported in a floating manner, they tend to scalp the higher regions and miss the lower regions. While non-floating cutting units might be acceptable for residential use, certainly golf course and estate maintenance require that the cutting units individually follow the subtle variations of the ground to maintain a consistently good cut across the entire swath, regardless of the immediate topography encountered by each individual cutting unit.

In addition to floating, applicants perceive that cutting units should be attached to the traction vehicle such that they are not permanently damaged if they should collide with an immovable object, such as a tree, during operation. When the cutting units of prior art mowers encountered immovable objects during mowing operations, they or their support structures, or both, were oftentimes severely damaged. Applicants perceive that cutting unit should be mounted such that they can temporarily "breakaway" from their normal operating positions in the event of such an impact. Further, the cutting units should be easily reset into their normal positions following the collision.

Another preferred feature of a cutting unit support system is the ability to support a wing or outboard cutting unit such that its outermost tip is readily observable by the operator, permitting the wing decks to be used for precise trimming. While this feature may seem obvious at first glance, prior art machines have generally not provided it, presumably because if the wing decks extend laterally outward from the operator's set the operator's side-to-side vision is greatly reduced when the decks are in their raised transport positions. Reference is made to FIGS. 1B and 2B, which show prior art units and the extent to which the operator's field of vision is reduced in transport mode. FIG. 1B illustrates a mower of the type sold by Jacobsen under the HR-15 designation; and FIG. 2B illustrates a mower of the type sold by Howard Price under the Hydro-Power 180 designation. The operator's side-to-side vision is almost completely blocked with the HR-15; whereas some side-to-side and some rear vision are blocked by the wing decks of the Hydro-Power 180.

The connection between the cutting units and the traction vehicle must also permit, if not assist, lifting of the cutting units from their lowered cutting positions to their raised transport positions. The operator might want to temporarily raise one or more of the cutting units to mow a narrower swath or to pass through a gate or between trees. Also, it is occasionally necessary to drive mowing machines over conventional road surfaces, at which time it is important to raise the cutting units to a transport position since they are not entirely suitable for repeatedly running up and down over curbs, nor for travel over paved streets at anything approaching the speed of ordinary city traffic. In view of this, most riding mowers, such as the one described in U.S. Pat. No. 2,299,859, include mechanisms which can raise the cutting units upward and toward the traction vehicle.

Once the cutting unit is raised into its transport position a preferred support system provides several important features. For example, when a cutting unit is in its raised or transport position, it must be held there very securely. Otherwise, it may tend to swing or rock and thereby cause personal injury or damage to the mower. For mowers having hydraulically-operated lift arms, additional mechanical latches or locks have traditionally been used to hold the lift arms in their raised or transport positions. This is due to the fact that some hydraulic cylinders are incapable of holding lift arms and cutting units in their raised positions because of hydraulic fluid leakage over a period of time.

As noted above, when the cutting units are in their raised transport positions the operator should preferably still have a 360° field of vision. Reference is again made to the prior art designs of FIGS. 1B and 2B.

Also, when the cutting units are in their raised positions the center of gravity of the entire machine should not be too high, for otherwise the machine will not be able to safely negotiate sidehills and the like. Particularly for a front drive, rear steer mower, some of the weight of the wing decks should be borne by the rear wheels when the machine is in its transport mode, for otherwise the back end of the mower can literally lift off the ground when the mower is suddenly stopped for any reason. Prior art machines were not well balanced in the transport mode. For example, little if any of the weight of the HR-15 wing decks (see FIG. 1B) is borne by the rear steerable wheels.

Finally, Applicants perceive that when the lateral or wing cutting units are raised the overall width of the mower should preferably be less than the width of the front deck to permit close trimming with the front deck only. FIGS. 1A and 2A show top views of the HR-15 and Hydro-Power 180 mowers with the deck in transport mode. Of particular note is the fact that the raised wing decks extend beyond the outer edges of the front decks, thus hindering trimming.

The present invention addresses the problems associated with prior art cutting unit support systems. In particular, the cutting unit support system of the present invention accommodates deck floating and breakaway in the cutting position; and securely holds the cutting units, maintains a relatively low center of gravity, and maximizes the operator's field of vision in the transport position.

SUMMARY OF THE INVENTION

Accordingly, one embodiment of the invention broadly includes a system suitable for use with a mower for operatively connecting a wing cutting unit to a traction unit, including a main lift arm assembly pivotally connected to the traction unit; "lift arm extension means" for pivotally connecting the main lift arm assembly to the cutting unit; means for raising the lift arm assembly and lift arm extension means such that the wing cutting unit moves from a cutting position to a transport position; and means for pivoting the lift arm extension means and the cutting unit relative to the main lift arm assembly as the main lift arm assembly and lift arm extension are raised relative to the traction unit, whereby the cutting unit is simultaneously raised and rotated relative to the traction unit so that the mower possesses a reasonably low center of gravity when the cutting unit is in its transport position and so that operator field of vision is not significantly reduced.

Another embodiment of the invention broadly includes a system for supporting a cutting unit in relation to a traction unit, including a lift arm aseembly and a resilient bushing assembly suitable for coupling the lift arm assembly and the cutting unit to provide a degree of give between the assemblies, whereby vibration and noise are reduced and the cutting unit can float relative to the traction unit.

Still another aspect of the invention is a breakaway assembly for use with a wing deck cutting unit. That is, one aspect of the invention is a system for supporting a wing cutting unit relative to a traction unit, including a lift arm assembly pivotally connected to the traction unit and the cutting unit, wherein the cutting unit can "yaw" relative to the traction unit; a breakaway assembly; and means for connecting the breakaway assembly to the cutting unit and to the traction unit, wherein during normal use the breakaway assembly doesn't come into play, but when the cutting unit strikes an immovable object the breakaway assembly separates to prevent damage to the cutting unit.

Additional features and aspects of the invention are described in detail below with reference to the Drawings.

BRIEF DESCRIPTION OF THE DRAWINGS

The invention will be further described with reference to the Drawings, wherein.

DETAILED DESCRIPTION OF THE INVENTION

Figure 3:
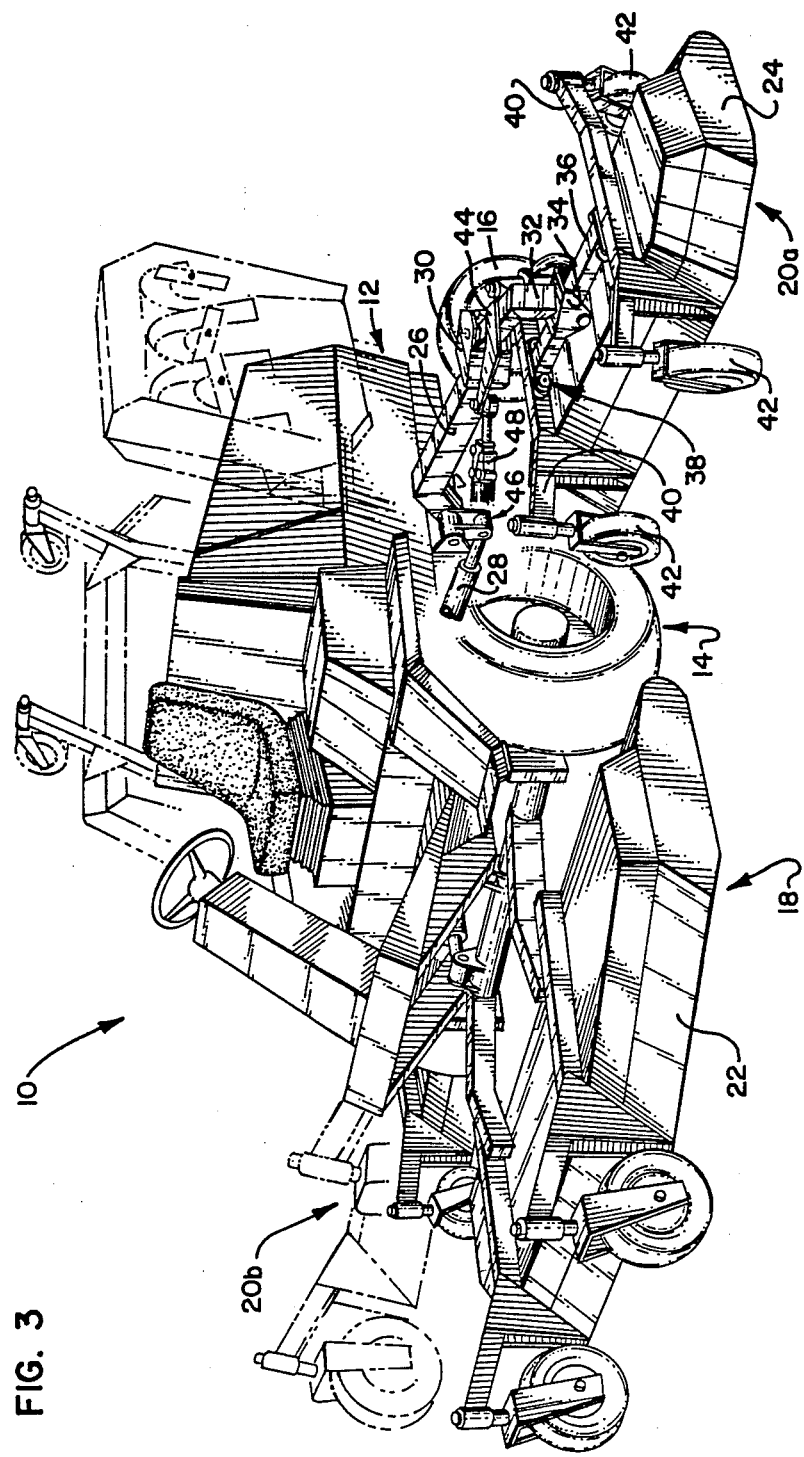
FIG. 3 is a perspective view of a mower according to the present invention.

With reference to the Drawings, wherein like reference numerals designate like parts and assemblies throughout the several views, FIG. 3 shows a perspective view of a mower 10 according to the invention. Mower 10 includes a traction vehicle 12 supported by a pair of front drive wheels 14 and a pair of rear steerable wheels 16. Traction vehicle 12 also carries a prime mover connected through a transmission to drive wheels 14. Traction vehicle 12 supports a front deck 18 and a pair of wing decks 20a and 20b, the blades of which are driven either hydrualically or through a power take-off (PTO) to the prime mover. The decks 18, 20 are shown in their cutting positions in solid line; and in their transport positions in phantom line. Front deck 18 includes a front deck housing 22. Wing decks 20 include wing deck housings 24. Wing decks 20a and 20b and their supporting structures are symmetrical about the longitudinal centerline of mower 10. Therefore, only deck 20a and its supporting members, shown in FIG. 3, will be described in any detail.

Pivotally connected to each side of traction vehicle 12 is the near end of a main wing deck lift arm 26. Operating each main wing deck lift arm 26 is a double-acting cylinder 28 attached at one end to traction vehicle 12 and at the other end to main lift arm 26. At the far end of each main wing deck lfit arm 26 is a pivot/cam assembly 30 which includes a pivot joint between main wing deck lift arm 26 and a lift arm extension 32, as further discussed below. The far end of lift arm extension 32 terminates in a U-shaped bracket 34 which in turn pivotally supports a substantially horizontal (in the cutting mode) roll member 36. Roll member 36 is connected by means of four bushing assemblies 38 to a pair of housing struts 40 which are in turn rigidly connected to housing 24. Struts 40 are rollably supported at either end by casters 42 which are ground following devices establishing the height of cut of deck 20. Extending toward traction vehicle 12 from lift arm extension 32 is a tie rod bracket 44, and extending between traction vehicle 12 and tie rod bracket 44 is a tie rod 46 which includes a breakaway assembly 48, the function of which is further discussed below.

As further described below, deck 20 can "float" relative to traction vehicle 12. That is, as casters 42 follow ground undulations struts 40 and housing 24 also "pitch," "roll," "yaw," and translate vertically depending on the terrain. Deck 20 is permitted to roll from side to side, primarily because roll member 36 can substantially freely pivot relative to roll member pivot bracket 34 when deck 20 is in its cutting position. Bushing assemblies 38 also permit some motion of struts 40 and housing 24 relative to roll member 36 and therefore contribute to the floating of deck 20. Further, bushing assemblies 38 absorb bothersome vibration, thus reducing noise and fatigue of the various components of mower 10. Bushing assemblies 38 also permit a limited amount of "pitching" and "yawing" of housing 24 relative to roll member 36, and ultimately relative to traction vehicle 12. Limited vertical movement of deck 20 is accommodated by main wing deck lift arm 26 which can pivot to some degree relative to traction vehicle 12 when deck 20 is in its cutting position.

Double-acting cylinder 28 can be controlled by a hydraulic system powered by the prime mower. The hydraulic system can include one or more manually-operated selector valves which can be manipulated to cause double-acting cylinder 28 to act on main wing deck lift arm 26 to raise, lower, lock or "float" (partially counterbalance) deck 20. One such hydraulic system is generally disclosed in U.S. Pat. No. 4,307,559. While this patent does not disclose use of a double-acting cylinder, a pair of single-acting cylinders could be used in lieu of double-acting cylinder 28. Either a double-acting cylinder or a pair of single-acting cylinders is necessary because main wing deck lift arm 26 must be raised and lowered under power because of its inherent stability in the cutting and transport modes, as further discussed below. Front deck 18 and its supporting structure can be raised, lowered and floated relative to traction vehicle 12 using a standard hydraulic system. The present invention is primarily directed toward wing deck configuration, arrangement and support. Therefore, front deck 18 and its attendant parts will not be described in any detail.

Each of the major components of wing deck 20 and its support structure is described below.

BREAKAWAY ASSEMBLY 48

As discussed above, breakaway assembly 48 is included as part of tie rod 46. During normal cutting, tie rod 46 and breakaway assembly 48 extend between traction vehicle 12 and tie rod bracket 44 and substantially prevent pivoting of lift arm extension 32 relative to main lift arm 26 and "yawing" of wing deck assembly 20, except for the limited yawing motion provided by bushing assemblies 38. However, when wing deck assembly 20 strikes an immovable object, e.g., a tree, breakaway assembly 48 releases and allows tie rod 46 to immediately lengthen to minimize the shock associated with the impact. The structure of breakaway assembly 48 is described below.

Figure 6B:
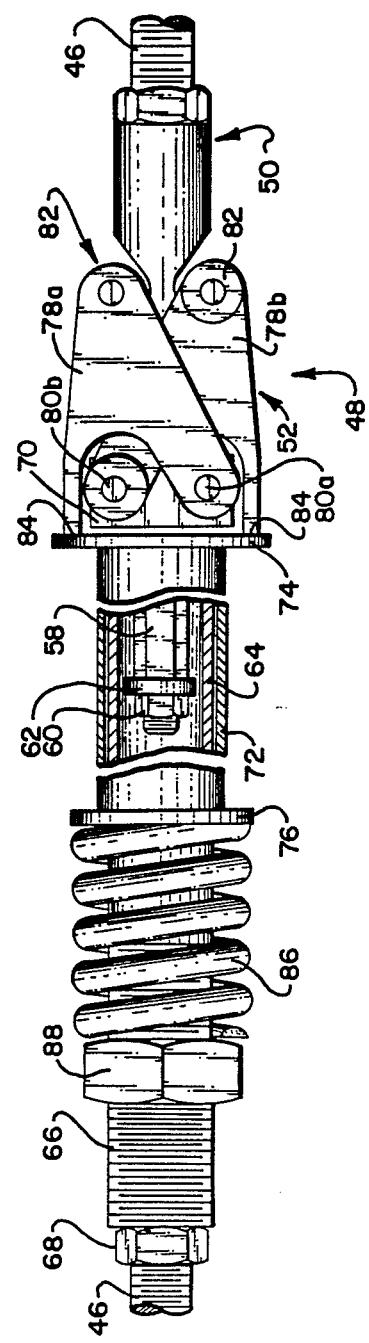
FIG. 6B is an enlarged elevational view, partly in section, of the tie rod and breakaway assembly of FIG. 6A.
Figure 6A:
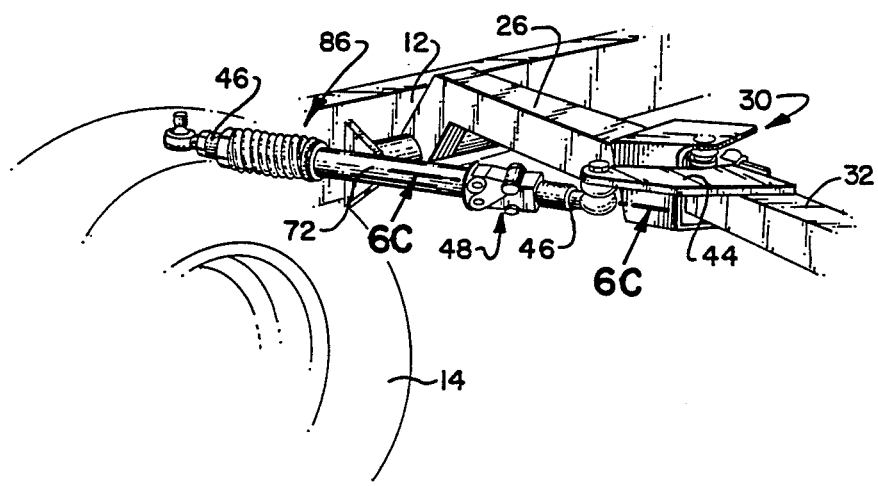
FIG. 6A is an enlarged partial perspective view of another portion of the wing deck support system of FIG. 3, including the tie rod and breakaway assembly.

FIG. 6A shows an enlarged partial perspective view of tie rod 46 and breakaway assembly 48 and the means (i.e., ball joints) by which these components connect to traction vehicle 12 and tie rod bracket 44. FIG. 6B shows an enlarged partially sectioned view of tie rod 46 and breakaway assembly 48. As shown in the Figures, breakaway assembly 48 includes two basic subassemblies, a male assembly 50 adjustably connected to the portion of tie rod 46 extending from tie rod bracket 44; and a female assembly 52 connected to the portion of tie rod 46 extending from traction vehicle 12.

Figure 6C:
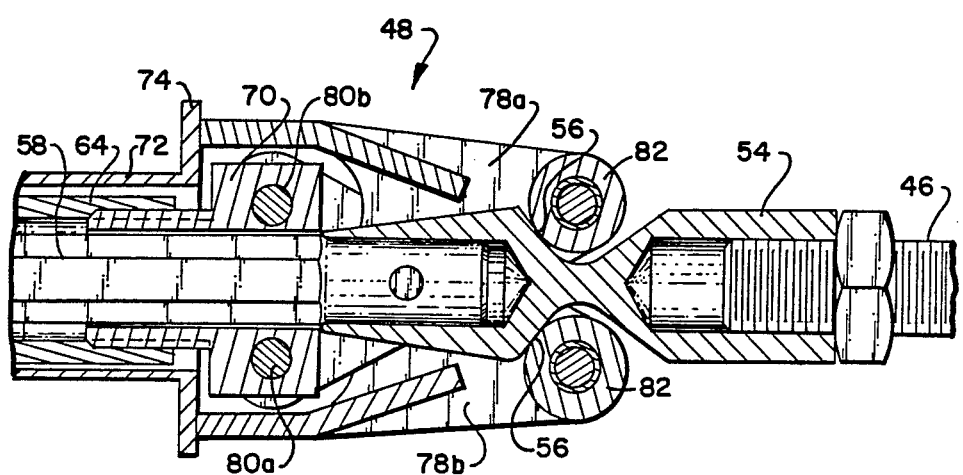
FIG. 6C is a sectional view of the breakaway assembly of FIG. 6A, taken generally along line 6C—6C.

With particular reference to FIG. 6C, a sectional view of breakaway assembly 48, male assembly 50 includes an element 54 threaded on tie rod 46 having a necked-down region forming a pair of ramp surfaces 56. Connected to element 54 on the end opposite from tie rod 46 and axially aligned therewith is a hex rod 58 at the far end of which is a stop nut 60 and a stop washer 62 (see FIG. 6B), the function of which is described below.

Female assembly 52 includes several "stationary" components which are rigidly connected to tie rod 46. One of these componenets is an inner tube 64 which is adjustably connected to tie rod 46 by means of an inner tube extension 66 and a lock nut 68. At the far end of inner tube 64 (opposite end from lock nut 68) is a pivot block 70 which includes a central aperture suitable for slidably receiving hex rod 58 of male assembly 52. Sliding on the outside of inner tube 64 is an outer tube 72 which forms an outer tube leaf flange 74 at one end and an outer tube spring flange 76 at the opposite end. Pivot block 70 pivotally supports first and second leaves 78a and 78b at first and second leaf pivot points 80a and 80b, respectively. At the distal ends of leaves 78 are rollers 82. At the proximal ends of leaves 78 are contact surfaces 84 which bear against outer tube leaf flange 74. Finally, a compression spring 86 compressively engages an adjustment nut 88, which is threaded onto inner tube extension 66, and outer tube spring flange 76.

The operation of breakaway assembly 48 can now be described. During normal use of mower 10 compression spring 86 provides enough force against outer tube 72 to substantially prevent pivoting of leaves 78. Therefore, ramps 56 on male element 54 cannot force leaves 78 open to allow the escape of element 54, and lift arm extensnion 32 cannot pivot relative to main arm 26. However, when wing deck assembly 20 strikes an immovable object, ramps 56 can separate leaves 78 in spite of the force provided by spring 86 to a sufficient extent to allow male element 54 to escape leaves 78. However, the male and female halves 50 and 52 of breakaway assembly 48 cannot entirely separate, since stop washer 62 eventually contacts the inner surface of pivot block 70 which slidably receives hex rod 58. A hex rod is used rather than a circular rod to ensure a consistent orientation of male assembly 50 relative to female assembly 52. Male and female assemblies 50 and 52 can be reconnected by simply raising wing deck assembly 20 by appropriately energizing double-acting cylinder 28, but the proper orientation between the assemblies must be maintained, because male element 54 is not circular but is instead flat on two sides. It should be noted that the breakaway force can be adjusted by turning nut 88 relative to inner tube extensnion 66 to increase or decrease the spring force.

BUSHING ASSEMBLIES 38

Figure 7A:
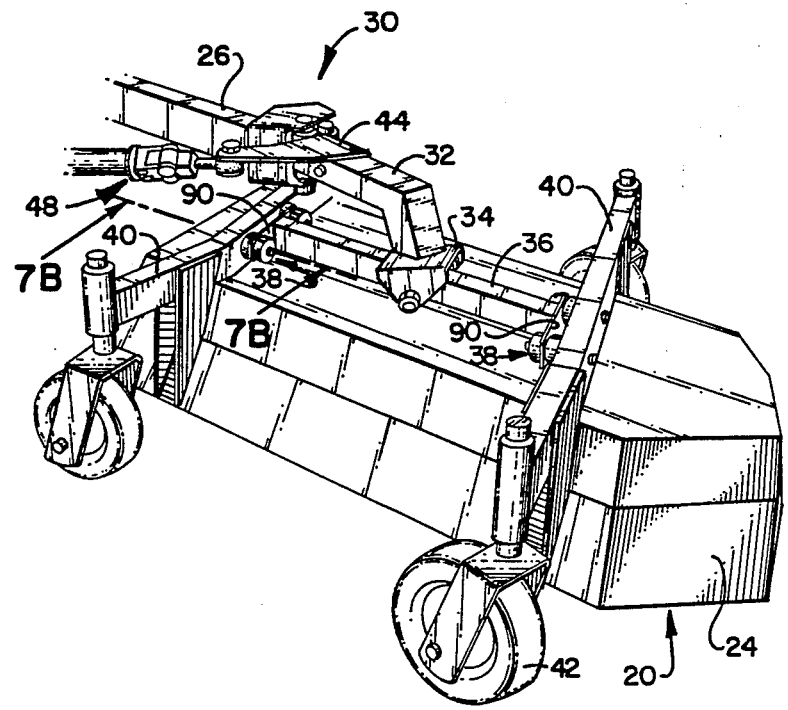
FIG. 7A is an enlarged perspective view of one of the wing decks of the mower of FIG. 3, showing in particular the bushing support system.
Figure 7B:
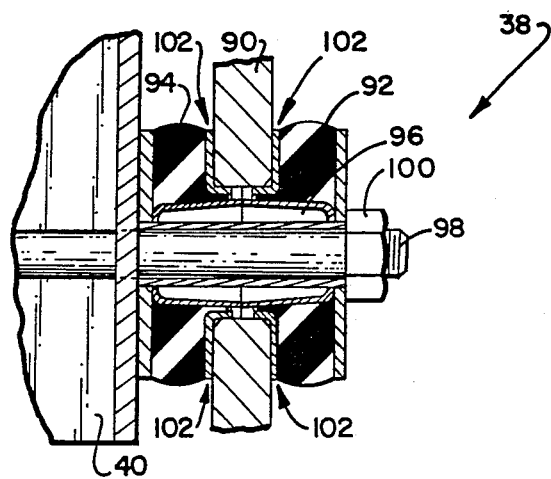
FIG. 7B is an enlarged sectional view of one of the bushing assemblies of the bushing support system shown in FIG. 7A taken generally along line 7B—7B.

As noted above, four bushing assemblies 38 are interposed between roll member 36 and housing struts 40. FIG. 7A is an enlarged perspective view of wing deck assembly 20 showing the preferred locations of bushing assemblies 38. And, FIG. 7B is an enlarged sectional view of one of the bushing assemblies 38. With reference to FIGS. 7A and 7B, bushing assemblies 38 are mounted on bushing assembly mounting plates 90 located at either end of roll member 36 and substantially perpendicular thereto. Mounting plates 90 form holes at either end thereof to receive bushing assemblies 38. All of the components of bushing assembly 38 are axially aligned. Referring to FIG. 7B, each bushing assembly 38 includes an inner bushing 92 and an outer bushing 94. Bushings 92, 94 are resilient, preferably rubber, and are substantially toroidal. Inner bushing 92 is located on the inside (toward bracket 34) of mounting plate 90 whereas outer bushing 94 is located on the outside (opposite from bracket 34) of mounting plate 90. Extending through the aperture formed by mounting plate 90 and inwardly concentric with inner and outer bushings 92 and 94 is a hollow sleeve 96. Sandwiching each bushing 92, 94 is a pair of metal washers 102 bonded to the rubber bushings 92, 94. And, extending through housing strut 40 and the other components of bushing assembly 38 is a bushing bolt 98. Bolt 98 and a bushing nut 100 connect the entire assembly together and to housing strut 40. It can therefore be seen that housing strut 40 can move to a degree relative to roll member 36. When it does so, bushings 90, 94 compress or expand to provide some "give" so that deck 20 can float relative to traction vehicle 12 to follow the immediate terrain encountered by deck 20. Bushings 92, 94 can be purchased from Lord Corporatiion under the designation SSB Series Sandwich Mount. Bushing assemblies 38 allow housing 24 to yaw, pitch and roll relative to roll member 36. It should be noted that bushing assemblies 38 not only provide limited floating but also minimize vibration and noise. By providing some give between housing 24 and roll member 36, the remaining components of wing deck assembly 20 are subjected to less vibration.

LIFT ARMS 26, 32 AND PIVOT/CAM ASSEMBLY 30

Figure 5A:
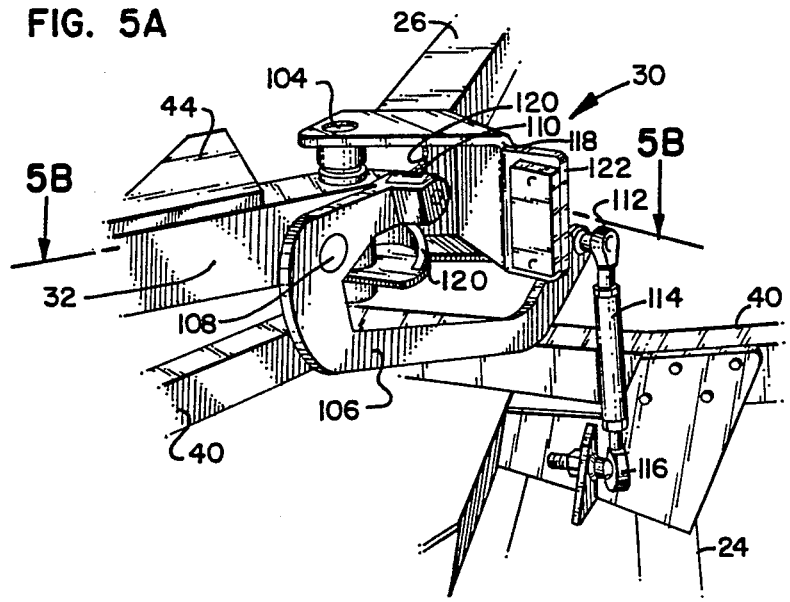
FIG. 5A is an enlarged partial perspective view of a portion of one of the wing deck support systems of the mower of FIG. 3.
Figure 5B:
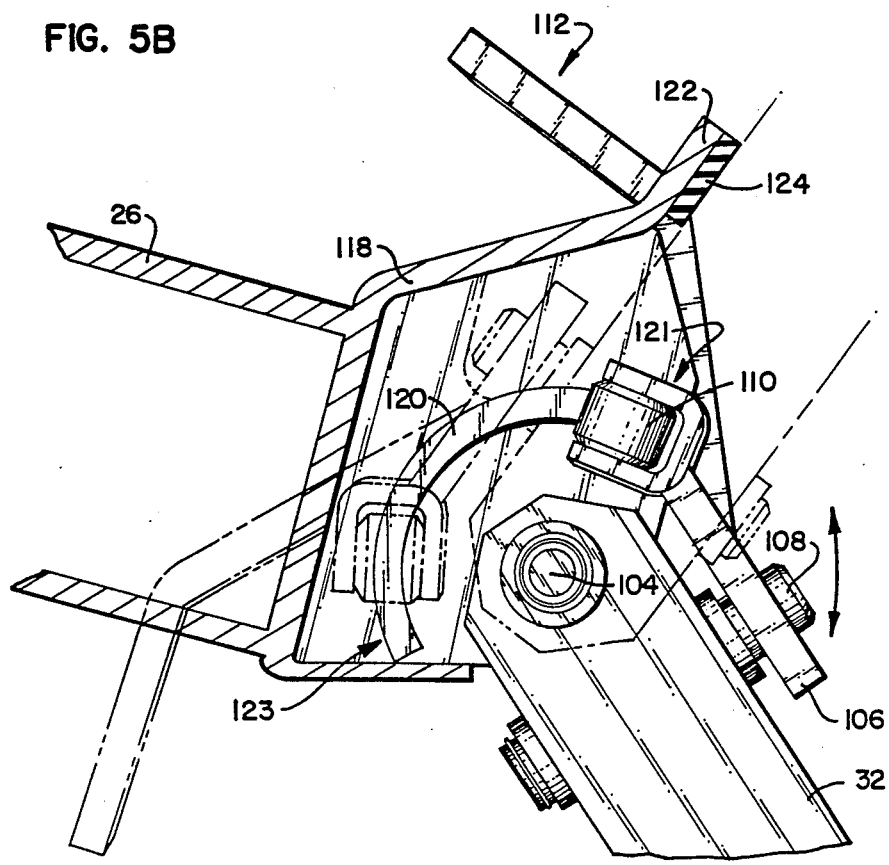
FIG. 5B is an enlarged sectional view taken generally along line 5B—5B of FIG. 5A.
Figure 8:
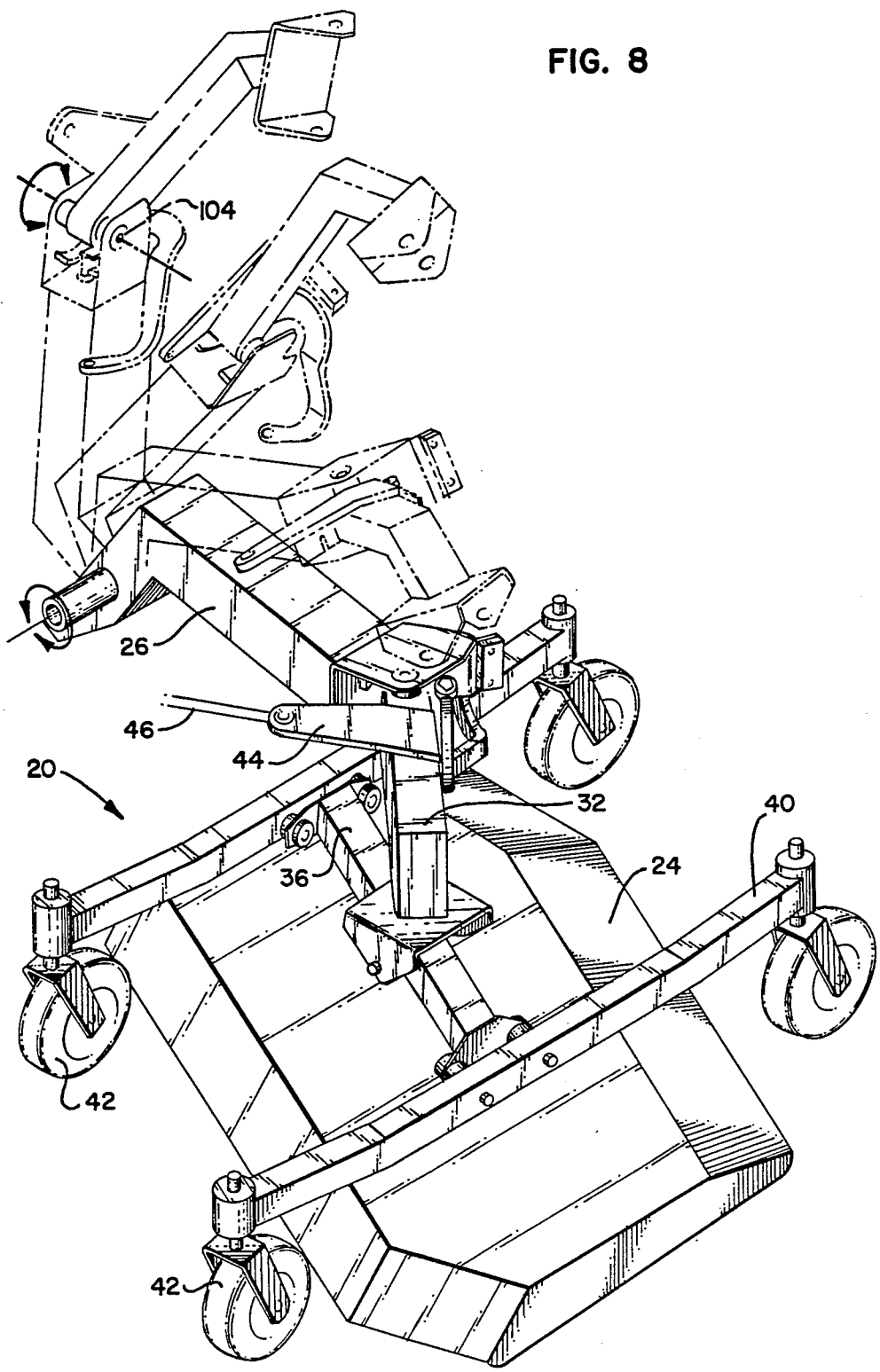
FIG. 8 is a partial perspective view of one of the wing decks of the mower shown in FIG. 3, and its support system, in various positions.

Reference to now made to FIGS. 5A, 5B and 8, where lift armks 26 and 32 and pivot/cam assembly 30 are shown in some detail. FIG. 5A shows an enlarged perspective view of a portion of the left wing deck assembly 20 as viewed from the rear; FIG. 5B shows an enlarged view of pivot/cam assembly 30, partly in section; and FIG. 8 diagrammatically illustrates the motion of deck 20 as it is raised from its cutting position to its transport position. As can be seen, lift arm extension 32 pivots about main lift arm 26 at pivot point 104. The precise construction of joint 104 is not critical, and any conventional bearing assembly could be used. Pivoting about lift arm extension 32, on the side opposite from breakaway assembly 48, is a substantially C-shaped pivot arm 106. A pivot joint 108 is established between these two components. At one end of the "C" is a cam followr 110; and at the other end of the "C" is an upper ball joint 112. Extending downward from upper ball joint 112 is a pivot arm extension 114 which terminates with a lower ball joint 116 connected to housing 24.

Pivot/cam assembly 30 includes a generally U-shaped cam bracket 118 situated at the distal end of main lift arm 26. Cam bracket 118 internally forms a pair of arcuate three dimensional cam surfaces 120 which are quite separated at their outer ends and which converge toward their inner ends. Reference is made to FIG. 5B which shows the path of cam follower 110 along arcuate upper and lower cams 120. At end 121 the distance between cam surfaces 120 is several inches, whereas the cams 120 are much closer at their ends 123. In fact, roller 110 has so much play at cam end 121 that deck housing 24 can roll about 20° side-to-side; and virtually no play at end 123. Thus, when deck assembly 20 is in its cutting position, as shown in solid line in FIG. 3, there is a considerable amount of play of pivot arm 106 relative to lift arm extension 32. The result is that housing 24 can pivot or "roll" to a considerable degree relative to lift arm extension 32 when deck assembly 20 is in its lowered or cutting position. As deck 20 is raised, however, lift arm extension 32 is pivoted relative to main lift arm 26 about joint 104 such that cam follower 110 rotates into the converging cam surfaces 120, thereby progressively decreasing the play of pivot arm 106. Ultimately, when the deck 20 is in its fully raised or transport position, as shown in phantom line in FIG. 3, there can virtually be no movement of pivot arm 106 relative to lift arm extension 32 which securely locks deck 20 in its transport position relative to lift arm extension 32. Pivot/cam assembly bracket 30 also forms an extension 122 which supports a rubber bumper 124. As shown in FIG. 5B, bumper 124 functions to support and cushion lift arm extension 32 when it rotates to its fullest extent relative to main arm 26, i.e., when the deck 20 in its transport position.

FIG. 8 illustrates in diagrammatic fashion the motion of lift arms 26, 32 as deck 20 is raised from its cutting position to its transport position. As deck 20 is raised, tie rod assembly 46 acts on tie rod bracket 44 to rotate lift arm extension 32 relative to main lift arm 26. This causes cam follower 110 to proceed into the converging cam formed by cam surfaces 120. Lift arm extension 32 continues to rotate relative to main lift arm 26 as deck 20 is raised until finally in the fully raised position lift arm extension 32 is as shown in FIG. 8. It should again be noted that rotation of lift arm extension 32 relative to main lift arm 26 is due to the fact that tie rod assembly 46, 48 is longer than main lift arm 26 and as tie rod assembly 46, 48 and lift arm 26 are raised tie rod assembly 46, 48 in effect pushes on tie rod bracket 44 to cause it to in turn rotate lift arm extension 32 relative to main lift arm 26. It should be noted that lift arm extension 32 rotates roughly 110° from the cutting position to the transport position. It should also be noted that the leading edge of housing 24 is facing directly upward when the deck 20 is fully raised. Also, main lift arm 26 is actually rotated overcenter when going from the cutting position to the transport position so that it is stable and there is no need to rely on hydraulic cylinder 28 to maintain deck assembly 20 in its transport position.

Figure 2A:
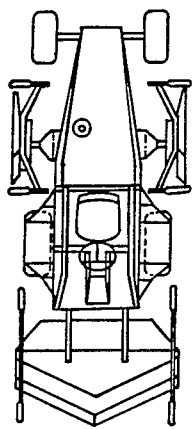
FIG. 2A is a top view of a second prior art turf mowing machine in the transport mode.
Figure 2B:
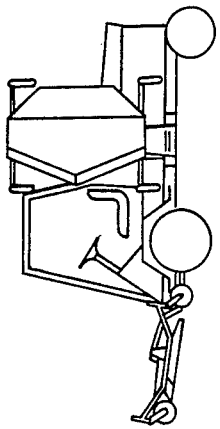
FIG. 2B is a side elevational view of the mower of FIG. 2A in its transport mode.
Figure 4A:
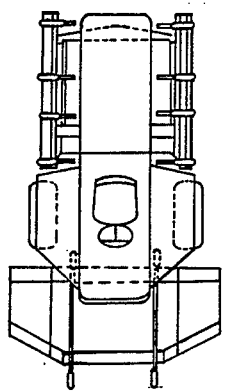
FIG. 4A is a top view of the mower of FIG. 3 in its transport mode.
Figure 4B:
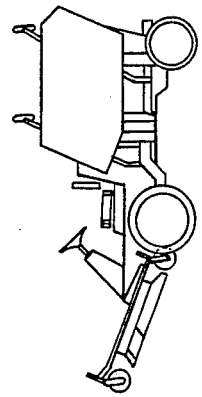
FIG. 4B is a side elevational view of the mower of FIG. 3 in its transport mode.
Figure 1A:
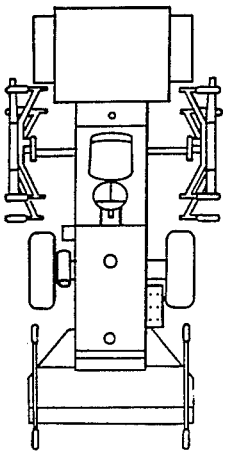
FIG. 1A is a top view of a first prior art turf mowing machine in the transport mode.
Figure 1B:
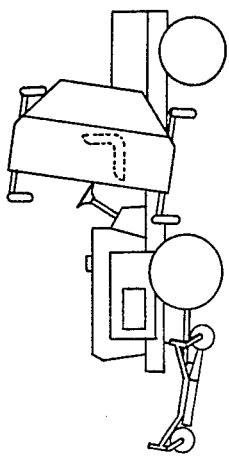
FIG. 1B is a side elevational view of the mower of FIG. 1A in its transport mode.
Figure 2C:
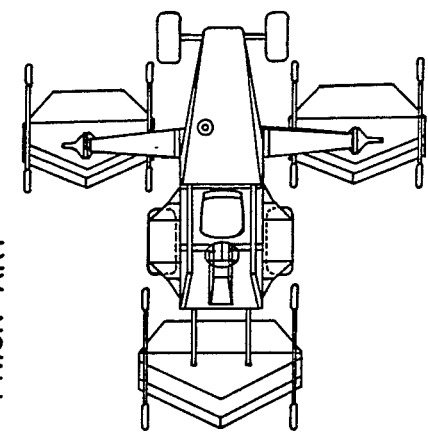
FIG. 2C is a top plan view of the mower of FIG. 2A in its cutting mode.
Figure 4C:
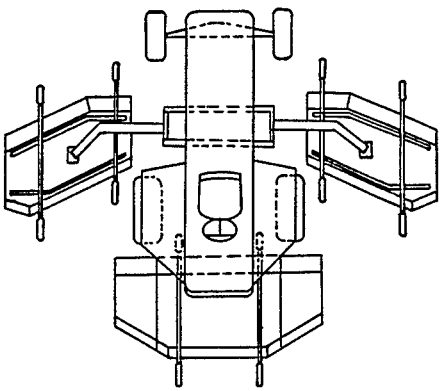
FIG. 4C is a top plan view of the mower of FIG. 3 in its cutting mode.
Figure 1C:
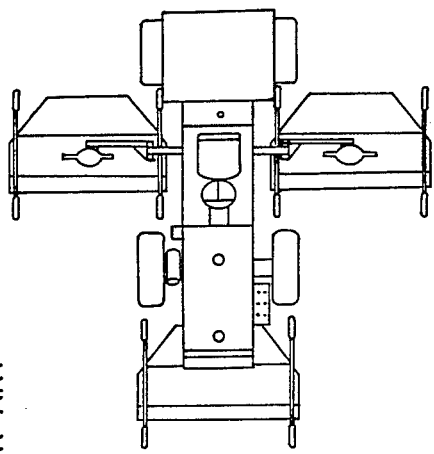
FIG. 1C is a top plan view of the mower of FIG. 1A in its cutting mode.

Referring to FIGS. 3 and 4B, it can be seen that since the wing decks 20 are not only raised but are also rotated the operator has a 360° field of view. It should also be noted that front deck housing 22 is the widest component of mower 10 when the wing decks are raised so that the front deck of mower 10 can readily be used for more precise trimming operations, in sharp contrast to prior art mowers. This is shown in FIG. 4A (mower 10) and FIGS. 1A and 2A (prior art). Finally, due to the fact that decks 20 are lifted and rotated into the transport mode, some of their weight is transferred to the rear wheels. This alleviates the problem of "rear wheel liftoff" during transport mode braking.

There are other modifications which will be apparent to those skilled in the art. Accordingly, the scope of this invention will be limited only by the appended claims.

We claim:

1. For use with a mower having a traction vehicle and a wing cutting unit, a system for supporting the wing cutting unit relative to the traction vehicle, comprising:
    (a) a lift arm assembly suitable for pivotally interconnecting the traction vehicle and the cutting unit, wherein the cutting unit can yaw relative to the traction vehicle;
    (b) a breakaway assembly; and
    (c) means for connecting the breakaway assembly to the cutting unit and to the traction vehicle, wherein during normal mowing operations the breakaway assembly prevents substantial yawing of the cutting unit relative to the traction vehicle but when the cutting unit strikes an immovable object the breakaway assembly releases to allow the cutting unit to yaw to prevent damage to the mower, and wherein the breakaway assembly can be automatically reset by raising the wing cutting unit with the lift arm assembly.

2. The wing unit supporting system of claim 1, wherein the breakaway assembly comprises a male assembly and a spring-loaded female assembly, wherein during normal mowing operations the spring force provided by the female assembly is sufficient to prevent an escape of the male assembly from the female assembly, but when the cutting unit strikes an immovable object the male assembly exerts sufficient force on the female assembly to overcome the spring force at which time the male assembly moves relative to the female assembly to cause a change in length of the breakaway assembly and a minimization of the impact and damage attributable thereto.

3. The wing cutting unit supporting system of claim 2, wherein the female assembly comprises a pair of leaves which are spring-loaded together and wherein the male assembly comprises a male element having a necked-down region and a pair of ramps extending therefrom, wherein when the cutting unit strikes an immovable object the ramps act on the spring-loaded leaves and if the force on the leaves is sufficient the male element escapes the leaves.

4. The wing cutting unit support system of claim 3, wherein following the escape of the male element from the female assembly the original configuration of the breakaway assembly can be reset by raising the cutting unit, thereby causing the male element to automatically reengage the female assembly.

5. The system of claim 4, wherein the male assembly further comprises a stop, wherein the male assembly cannot completely escape the female assembly in the event of an impact but wherein the breakaway assembly can lengthen to a predetermined extent to minimize the shock associated with the impact.

6. For use with a mower having a traction vehicle and a wing cutting unit, a system for operatively connecting the wing cutting unit to the traction vehicle and for moving the wing cutting unit from a cutting position to a transport position, wherein the cutting unit has a leading edge which faces forward when the cutting unit is in its cutting position, the system comprising:
    (a) a main lift arm assembly;
    (b) means for pivotally connecting the main lift arm assembly to the traction vehicle;
    (c) lift arm extension means for pivotally connecting the main lift arm assembly to the cutting unit;
    (d) means for raising the main lift arm assembly and the lift arm extension means such that the wing cutting unit moves from its cutting position toward its transport position; and
    (e) means for pivoting the lift arm extension means and the cutting unit relative to the main lift arm assembly as the main lift arm assembly and lift arm extension means are raised relative to the traction vehicle, wherein the cutting unit is simultaneously raised and rotated relative to the traction vehicle so that when the cutting unit reaches its transport position its leading edge substantially faces directly upward, whereby the mower possesses a reasonably low center of gravity and operator field of vision is not significantly reduced when the cutting unit is in its transport position.

7. The wing cutting unit connecting system of claim 6, wherein the cutting unit can yaw relative to the traction vehicle and wherein the pivoting means comprises a breakaway assembly and means for connecting the breakaway assembly to the lift arm extension means and the traction vehicle, wherein during normal mowing operations the breakaway assembly prevents substantial yawing of the cutting unit relative to the traction vehicle but when the cutting unit strikes an immovable object the breakaway assembly allows the cutting unit to yaw to prevent damage to the mower.

8. The wing cutting unit connecting system of claim 6, further comprising a resilient bushing assembly suitable for coupling the lift arm extension means and the cutting unit to provide a degree of give therebetween, whereby vibration and noise are reduced and the cutting unit can float to a degree relative to the traction vehicle.

9. In a mower having a traction vehicle and a wing cutting unit, wherein the wing cutting unit has a cutting position and a transport position and a leading edge which faces forward when the cutting unit is in its cutting position, a system for operatively connecting the wing cutting unit to the traction vehicle, comprising:
 (a) a lift arm assembly pivotally connected to the traction vehicle and the cutting unit;
 (b) means connected to the traction vehicle for selectively pivoting the lift arm assembly and cutting unit upward relative to the traction vehicle; and
 (c) means for rearwardly pivoting the cutting unit as it is pivoted upward, wherein when the cutting unit reaches its transport position its leading edge is substantially facing directly upward, whereby the mower possesses a reasonably low center of gravity and operator field of vision is not significantly reduced when the cutting unit is in its transport position.

10. For use with a mower having a traction vehicle and a wing cutting unit, a system for supporting the wing cutting unit relative to the traction vehicle, comprising:
 (a) a lift arm assembly suitable for pivotally interconnecting the traction vehicle and the cutting unit, wherein the cutting unit can yaw relative to the traction vehicle; and
 (b) breakaway means for substantially preventing yawing of the cutting unit relative to the traction vehicle during normal mowing operations, and for yieldably releasing to allow yawing of the cutting unit when the cutting unit collides with an immovable object, thereby preventing substantial damage to the mower, wherein the breakaway means can be automatically reset by raising the wing cutting unit with the lift arm assembly.

11. A mower comprising:
 (a) a traction vehicle;
 (b) a cutting unit having a cutting position and a transport position and a leading edge which faces forward when the cutting unit is in its cutting position;
 (c) a main lift arm pivotally attached to the traction vehicle suitable for pivoting in a substantially vertical plane, the main lift arm having a lower position corresponding to the cutting unit cutting position and an upper position corresponding to the cutting unit transport position;
 (d) a lift arm extension pivotally connected to the main lift arm suitable for pivoting in a substantially horizontal plane relative to the main lift arm when the main lift arm is in its lower position;
 (e) a resilient bushing assembly suitable for coupling the lift arm extension and the cutting unit to provide a degree of give therebetween, whereby vibration and noise are reduced and the cutting unit can float to a degree relative to the traction vehicle;
 (f) means for raising the main lift arm and the lift arm extension such that the main lift arm moves from its lower position toward its upper position and the cutting unit moves from its cutting position toward its transport position;
 (g) a breakaway assembly operatively connected to the traction vehicle suitable for pivoting the lift arm extension and the cutting unit relative to the main lift arm as the main lift arm and the lift arm extension are raised relative to the traction vehicle, wherein during normal mowing operations the breakaway assembly prevents substantial yawing of the cutting unit relative to the traction vehicle but when the cutting unit strikes an immovable object the breakaway assembly allows the cutting unit to yaw to prevent damage to the mower, and wherein the cutting unit is simultaneously raised and rotated relative to the traction vehicle so that when the cutting unit reaches its transport position its leading edge substantially faces directly upward, whereby the mower possesses a reasonable low center of gravity and operator field of vision is not significantly reduced when the cutting unit is in its transport position.

12. For use with a mower having a traction vehicle and a cutting unit, a system for supporting the cutting unit in relation to the traction vehicle, comprising:
 (a) a lift arm assembly suitable for connection to the traction vehicle;
 (b) a roll member connected to the lift arm assembly in such a way that the motion of the roll member relative to the lift arm assembly is limited to that of rolling from side to side; and
 (c) resilient means for connecting the cutting unit to the roll member, the resilient means resiliently allowing limited pitch and yaw of the cutting unit relative to the roll member and the lift arm assembly.

13. The cutting unit supporting system of claim 12, wherein the roll member is elongate and has first and second transversely-spaced ends; and the resilient means comprises first and second rubber bushing assemblies interposed between the roll member first and second ends, respectively, and the cutting unit.

14. The cutting unit supporting system of claim 13, wherein each rubber bushing assembly comprises a pair of longitudinally-spaced rubber bushings.

* * * * *